US012154221B2

(12) United States Patent
Xie et al.

(10) Patent No.: US 12,154,221 B2
(45) Date of Patent: Nov. 26, 2024

(54) SERVER AND INFORMATION PROCESSING METHOD FOR OUTPUTTING A 3D MODEL VIA AN API REQUEST (71) Applicant: VRC INC., Hachioji (JP)

(72) Inventors: Yingdi Xie, Hachioji (JP); Yanpeng Zhang, Hachioji (JP)

(73) Assignee: VRC INC. (JP)

( * ) Notice: Subject to any disclaimer, the term of this patent is extended or adjusted under 35 U.S.C. 154(b) by 0 days.

(21) Appl. No.: 17/787,762

(22) PCT Filed: Jul. 27, 2020

(86) PCT No.: PCT/JP2020/028755
§ 371 (c)(1),
(2) Date: Jun. 21, 2022

(87) PCT Pub. No.: WO2022/024195
PCT Pub. Date: Feb. 3, 2022

(65) Prior Publication Data
US 2023/0186555 A1 Jun. 15, 2023

(51) Int. Cl.
G06T 17/00 (2006.01)
G06F 9/54 (2006.01)
G06F 21/60 (2013.01)

(52) U.S. Cl.
CPC .............. *G06T 17/00* (2013.01); *G06F 9/547* (2013.01); *G06F 21/602* (2013.01)

(58) Field of Classification Search
None
See application file for complete search history.

(56) References Cited

U.S. PATENT DOCUMENTS 9,878,240 B2 * 1/2018 Gault ................... H04L 67/131
2004/0066417 A1 4/2004 Anabuki et al.
(Continued)

FOREIGN PATENT DOCUMENTS

CN 111192686 A 5/2020
JP 2000-057373 A 2/2000
(Continued)

OTHER PUBLICATIONS

Chinese Office Action including English Translation issued for corresponding China Patent Application No. 2020-800695269, dated Aug. 12, 2022 (17 pages).
(Continued)

*Primary Examiner* — Yingchun He
(74) *Attorney, Agent, or Firm* — Harness, Dickey & Pierce, P.L.C.

(57) ABSTRACT

A server includes an accessing means that accesses a database that stores 3D data sets for a plurality of objects. The 3D data sets include 3D modelling data and appendix data for each of the plurality of objects. The 3D modelling data also includes a plurality of elements. A receiving means receives an API request from an information processing device, the request including information that specifies an object, and an element to be used from among the plurality of elements. A transmitting means transmits to the information processing device, as an API response to the API request, data extracted from the database to output a 3D model of the object specified by the request information indicated by the 3D modelling data consisting of the specified element(s).

11 Claims, 7 Drawing Sheets (56) References Cited

U.S. PATENT DOCUMENTS

| | | | |
|---|---|---|---|
| 2010/0203968 A1 | 8/2010 | Gill et al. | |
| 2014/0125657 A1* | 5/2014 | Murali | |
| 2017/0061683 A1* | 3/2017 | Dorin | G06V 40/10 |
| 2018/0342106 A1 | 11/2018 | Rosado | |
| 2020/0009444 A1 | 1/2020 | Putnam | |
| 2020/0162236 A1 | 5/2020 | Miller et al. | |
| 2020/0184547 A1 | 6/2020 | Andon et al. | |
| 2021/0335041 A1* | 10/2021 | Haslam | G16H 50/50 |
| 2023/0019232 A1* | 1/2023 | Krotoff | G06T 15/04 |

FOREIGN PATENT DOCUMENTS

| | | | |
|---|---|---|---|
| JP | 2004-127024 A | 4/2004 | |
| JP | 2010-532890 A | 10/2010 | |
| JP | 2016-177137 A | 10/2016 | |
| JP | 6489726 B1 | 3/2019 | |
| WO | 2009/007701 A1 | 1/2009 | |

OTHER PUBLICATIONS

European Search Report issued in the corresponding European Patent Application No. 20947330.5; dated Jul. 24, 2023 (total 8 pages).
International Search Report (English and Japanese) issued in PCT/JP2020/028755, mailed Oct. 20, 2020; ISA/JP (5 pages).
Japanese Office Action issued in corresponding Japanese application 2020-190389, dated May 28, 2024; (6 pages).
Office Action issued in the corresponding Japanese Patent Application No. 2020-190389; mailed on Oct. 8, 2024 (total 6 pages).

\* cited by examiner

SERVER AND INFORMATION PROCESSING METHOD FOR OUTPUTTING A 3D MODEL VIA AN API REQUEST

CROSS REFERENCE TO RELATED APPLICATIONS

This application is a U.S. National Phase Application under 35 U.S.C. 371 of International Application No. PCT/JP2020/028755, filed on Jul. 27, 2020. The entire disclosure of the above application is expressly incorporated by reference herein.

BACKGROUND

Technical Field

The present disclosure relates to techniques for processing 3D modelling data.

Related Art

Known in the art are systems that process 3D modelling data representative of a 3D model of an object. For example, JP 6489726B discloses a technique for estimating dynamic personality of 3D modelling data, and to add data indicating the estimated personality to the 3D modelling data.

3D modelling data can be used in a variety of applications. The present disclosure provides techniques that facilitate the availability of 3D modelling data from a variety of applications.

SUMMARY

According to one aspect of the disclosure, there is provided a server includes: an accessing means that accesses a database storing 3D data sets for a plurality of objects, the 3D data sets including 3D modelling data and appendix data for each of the plurality of objects, the 3D modelling data including a plurality of elements; a receiving means that receives from an information processing device an API request including information specifying an object, and an element to be used from among the plurality of elements; and a transmitting means that transmits to the information processing device, as an API response to the API request, data for outputting a 3D model indicated by the 3D modelling data including elements of the object specified by the request information and extracted from the database.

The appendix data may include an image of the object obtained by an image capture device, and wherein the server may further include: a data requesting means that requests a generating means to generate 3D modelling data from the image of the object in accordance with an algorithm, and an obtaining means that obtains from the generating means the 3D modelling data generated from the image.

The data requesting means may request the generating means to regenerate the image and 3D modelling data using the updated algorithm in response to an event indicating that the algorithm has been updated in the generating means, and the obtaining means may obtain 3D modelling data using the updated algorithm.

The appendix data may include behavior information indicating a behavior of the object during a period from a date of the image capture to a present point in time, the requesting means may request the generating means to generate 3D modelling data using the image, the behavior data, and the updated algorithm, and the obtaining means may obtain, from the generating means, the image, the behavior data, and the 3D modelling data by using the updated algorithm.

The generating means may generate the 3D modelling data in accordance with one algorithm selected from among a plurality of algorithms, the API request may include information specifying the one algorithm from among the plurality of algorithms, and the data requesting means may select the one algorithm specified by the API request and requests generation of the 3D modelling data.

The receiving means may receive information indicating that the 3D modelling data has been edited in the information processing device, and the server may further include: a record request means that requests a record of an edit history indicating that the editing has been performed.

The server may further comprise an encrypting means that encrypts data for outputting the 3D model by using an encryption key generated using the edit history.

The receiving means may receive a record request from the information processing device to confirm whether the 3D modelling data is authentic and includes data indicating an edit history of 3D modelling data, and determines whether 3D modelling data is authentic by referring to the record.

The server may further include: a storage means that stores a private key of a management operator of the server, and public keys of a plurality of users, wherein the API request includes information identifying a public key of a user using the information processing device, the data for the 3D model requested by the API request is encrypted by the encrypting means with the private key of the management carrier and the public key of the user using the information processing device, and the transmitting means transmits data to output to the information processing device, as the API response, the 3D modelling data encrypted by the encrypting means.

The public key of the user may correspond to the private key of the management operator, and wherein the server may include: a distribution means for distributing the public key with a set expiration deadline.

According to another aspect of the disclosure, there is provided an information processing method including: accessing a database that stores 3D data sets for a plurality of objects, the 3D data sets including 3D modelling data and appendix data for each of the plurality of objects, the 3D modelling data including a plurality of elements; receiving from an information processing device an API request that includes information specifying an object and an element to be used from among the plurality of elements; and transmitting to the information processing device, as an API response to the API request, data for outputting a 3D model indicated by 3D modelling data of the specified element of the object specified by the request information extracted from the database.

Advantageous Effects

According to the present disclosure, 3D modelling data can be easily utilized for a variety of applications.

DETAILED DESCRIPTION

1. Configuration

Figure 1:
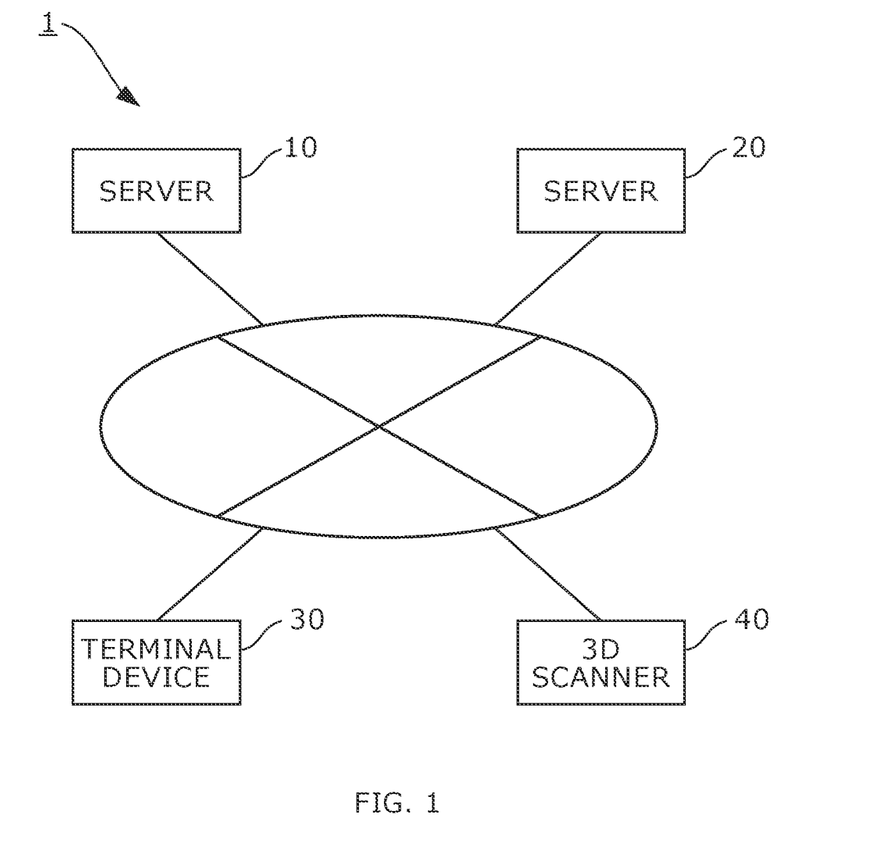
FIG. 1 is a diagram showing an outline of a 3D data system 1 according to an embodiment.

FIG. 1 is a diagram showing an outline of a 3D data system 1 according to an embodiment. 3D data system 1 provides 3D modelling data. Here, "3D modelling data" refers to data representing a 3D model of an object such as a human, an animal, or an article. A 3D model is a model that represents an appearance of an object in three dimensions. For example, an image generated from a photograph of an object is affixed to an outer surface of a 3D model. The 3D model is used, for example, as an avatar representative of the user or of a person different from the user in a virtual space. 3D models are used in a variety of applications, such as, for example, video games, video calls, video conferencing, shopping, and for fitness.

3D data system 1 includes server 10, server 20, terminal device 30, and 3D scanner 40. Server 10 is a server that manages 3D modelling data. Server 10 is managed by the administrator of 3D data system 1. Server 20 is a server that provides an application using 3D modelling. This application may be provided by a business entity who is the administrator of 3D data system 1, or by another business entity. Terminal device 30 is a user terminal that utilizes an application (i.e., utilizes 3D modelling). Terminal device 30 is an information processing device such as a smart phone, a tablet, or a personal computer. For simplicity, only one server 20, one terminal device 30, and one 3D scanner 40 are referred to here. However, 3D data system 1 may include plural servers 20 and/or plural terminal devices 30.

3D scanner 40 is a device that scans an object to generate 3D modelling data. 3D scanner 40 captures an image (i.e., a photograph) of the appearance of the object, and measures a distance from a reference position (e.g., a position of a sensor) to a surface of the object to obtain both image data and range data. Further, 3D scanner 40 processes the image data and range data using predetermined algorithms to generate 3D modelling data of the object. 3D scanner 40 uploads the generated 3D modelling data to server 10.

Server 20 provides an application program to terminal device 30. The application program includes a software module for sending an API (Application Programming Interface) request to server 10. For example, when terminal device 30 executes the application program, terminal device 30 transmits an API request to server 10 in accordance with the program. The API request is a request to transmit data (e.g., 3D modelling data) for output of a 3D model. Server 10 transmits an API response to the API request. The API response contains the requested 3D data. Terminal device 30 provides the user with an application that uses the 3D data.

Figure 2:
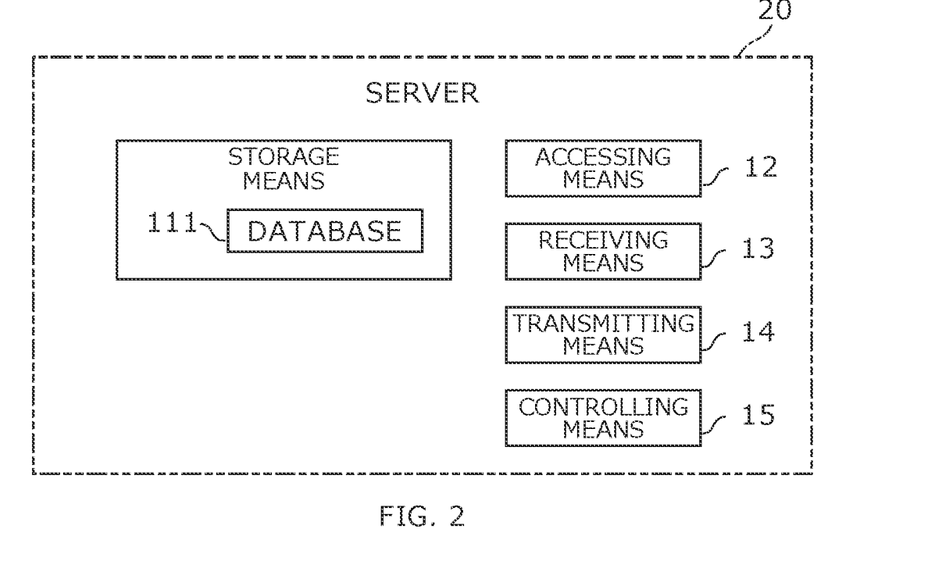
FIG. 2 is a diagram illustrating a functional configuration of server 10.

FIG. 2 is a diagram illustrating a functional configuration of server 10. Server 10 includes storage means 11, an accessing means 12, a reception unit 13, a transmission unit 14, and a controlling means 15. Storage means 11 stores various data. In this example, storage means 11 stores a database 111. Database 111 is a database that stores 3D data sets for plural objects (i.e., objects). The 3D data sets include 3D modelling data and appendix data for each of the plural objects. The 3D modelling data includes plural elements. Accessing means 12 accesses database 111.

Receiving means 13 receives an API request from terminal device 30. The API request is a request for providing 3D modelling data. The API request includes request information that identifies elements to be used from among the plurality of elements included in the object and the 3D modelling data. The transmitting means 14 transmits an API response to the terminal device from which the API request is transmitted. The API response includes data for outputting a 3D model indicated by 3D modelling data that includes elements of the object specified by the request information extracted from database 111. The data for outputting the 3D model may be 3D modelling data, or may be data indicating a result of processing 3D modelling data (e.g., movement image data obtained by moving the 3D model). Controlling means 15 performs various controls.

Figure 3:
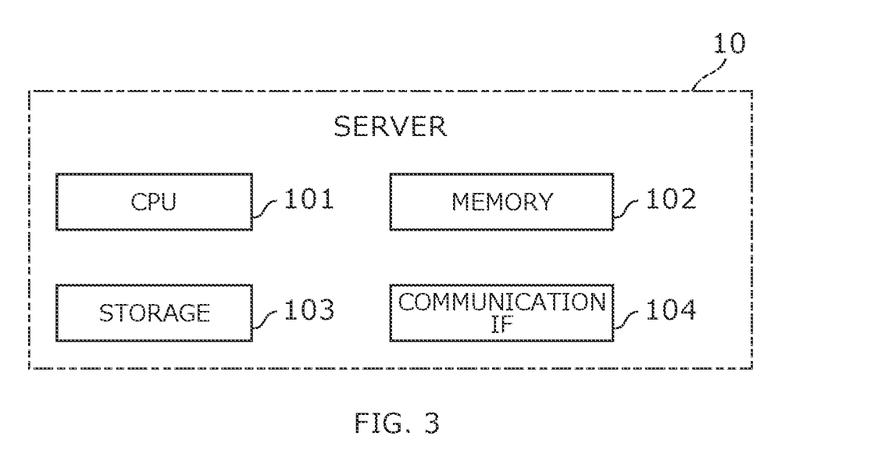
FIG. 3 shows an exemplary hardware configuration of server 10.

FIG. 3 shows an exemplary hardware configuration of server 10. Server 10 is a computer or information processing device having CPU (Central Processing Unit) 101, memory 102, storage 103, and communication IF 104. CPU 101 is a processor that performs various operations in accordance with a program. Memory 102 is a main storage device that functions as a work area when CPU 101 executes a process. Memory 102 includes, for example, RAM (Random Access Memory) and ROM (Read Only Memory). Storage 103 is a device for storing various data and programs, and includes, for example, an SSD (Solid State Drive) and/or HDD (Hard Disc Drive). Communication IF 104 is a device that communicates with other devices in accordance with a predetermined communication standard (e.g., ethernet), and includes, for example, NICs.

In this example, the program stored in storage 103 is a program (hereinafter, referred to as "management server program") that causes the computer device to function as server 10 in 3D data system 1. While CPU 101 is executing the management server program, at least one of memory 102 and storage 103 acts as the storage means 11. CPU 101 is one example of an accessing means 12 and a controlling means 15. Communication IF 104 is one of receiving means 13 and transmitting means 14.

2. Operation 2-1. Basic Operation

Figure 4:
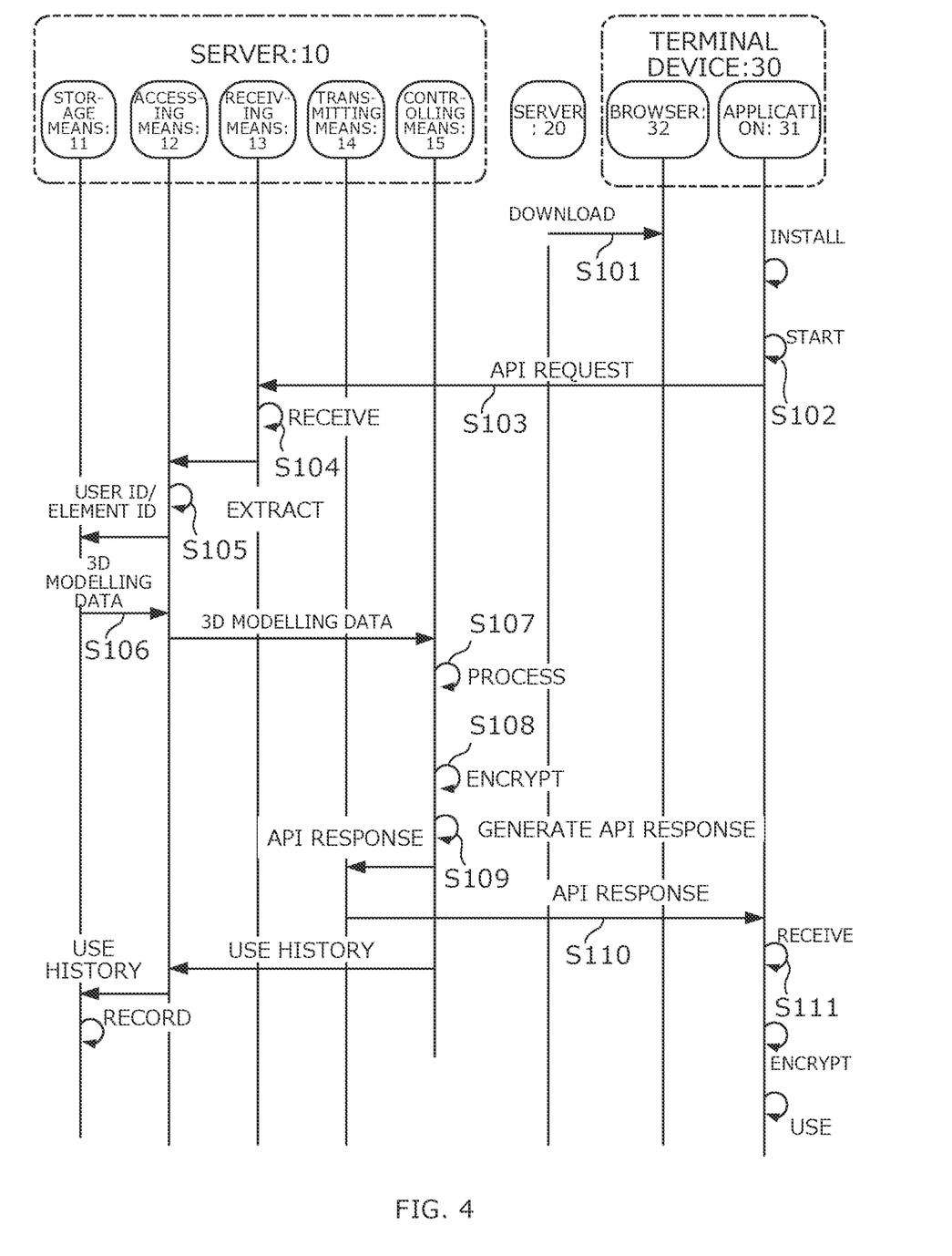
FIG. 4 is a sequence chart showing the operation of 3D data system 1.

FIG. 4 is a sequence chart showing the operation of 3D data system 1. In the following, functional elements such as accessing means 12 may be described as a subject of processing. However, hardware elements such as CPU 101, which execute the management server program, cooperate with other hardware elements to execute the processing.

The user of terminal device 30 instructs terminal device 30 to download an application program. The application program is, for example, an application program for a video game in which a player character is a user's 3D model. Terminal device 30 downloads (at step S101) the application program from server 20. When the download is complete, the user instructs start of the application program. Terminal device 30 starts (at step S102) the application program. The application that is implemented by the application program is referred to as application 31.

Application 31 uses the APIs provided by server 10 to obtain 3D data. Application 31 transmits (at step S103) an API request to server 10. The API request includes a user ID and an element ID. The user ID is identification information that uniquely identifies the user of 3D data system 1. The element ID is identification information that specifies at least a part of the elements included in 3D modelling data (described later) recorded in database 111.

In server 10, receiving means 13 receives an API request from terminal device 30 (step S104). Accessing means 12 extracts the user ID and the element ID from the received API request (step S105). Accessing means 12 accesses database 111 and extracts 3D modelling data corresponding to the user ID and the element ID (step S106).

Figure 5:
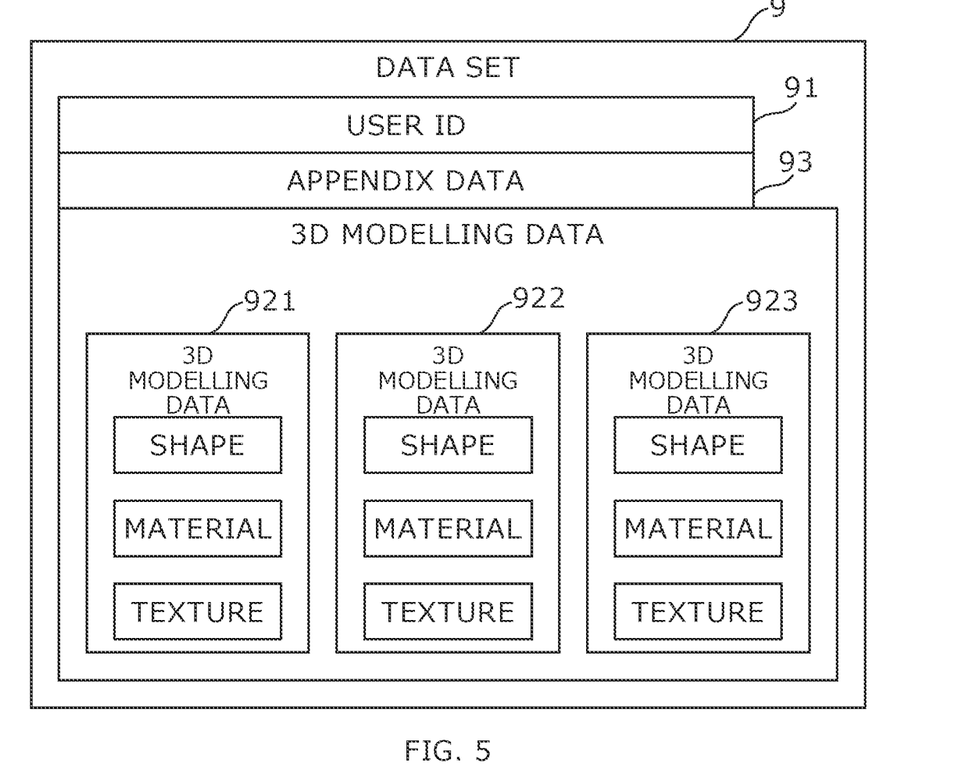
FIG. 5 is a diagram illustrating a configuration of 3D modelling data in database 111.

FIG. 5 is a diagram illustrating structures of 3D modelling data in database 111. Database 111 includes plural 3D data sets 9. A 3D data set is a group of data containing at least 3D modelling data. The respective 3D data set 9 includes user ID 91, 3D modelling data (or 3D modelling data body) 92 and appendix data 93. Appendix data 93 includes, for example, user attributes and update dates. User attributes indicate user attributes such as user ID, username, date of birth, gender, height, and weight. An update date indicates a date and time that a 3D data set was updated.

In this example, 3D modelling data 92 includes plural sets of 3D modelling data (three in the figure) representing the same object, namely, 3D modelling data 921, 3D modelling data 922, and 3D modelling data 923. 3D modelling data 921 includes data for defining shapes of objects. A shape of the object is defined as a polygon or as a free-form surface. 3D modelling data 921 further includes data relating to a material of the object. Information on the material of the object includes at least one of color, transparency, reflection, refractive index, self-luminescence, bump, and displacement. 3D modelling data 921 further includes textures. The texture is an image that is applied to the model. Similarly, 3D modelling data 922 and 3D modelling data 923 include data for defining shapes of models, and information on materials and textures. The data for defining the shapes of the models, and the information on the materials textures are examples of plural elements that constitute 3D modelling data 92.

In one example, each of the plurality of data has a different quality. In this example, 3D modelling data 921 is of high quality (i.e., consists of a large amount of data), 3D modelling data 922 is of medium quality (i.e., consists of a medium amount of data), and 3D modelling data 923 is of low quality (i.e., consists of a small amount of data). The high quality, medium quality, and low-quality 3D modelling data are examples of the elements that make up 3D modelling data 92.

In this embodiment, 3D modelling data 921 is divided into plural regions. That is, each of a shape, material, and texture is divided into plural parts. The plural parts are sections based on a body structure of a target, and include, for example, a head, chest, abdomen, hip, arms, hands, legs, and feet. At least some of these plural parts may be further subdivided into plural sub-parts. For example, the head may be divided into hair, eyes, nose, mouth, and ear. These parts are further examples of the plural elements constituting 3D modelling data 92.

Appendix data 93 includes bone data. Bones indicate elements that are units of movement for moving 3D models. For example, when 3D models are represented by polygons, correspondences (so-called skin weights) between vertices of the polygons and the bones are set (this process is referred to as skinning). As the bones move, the corresponding polygons follow the movement of the bones, whereby the entire 3D model moves. Bone data, like 3D modelling data, may also include sets of data of differing qualities. The bone data may be included in the 3D modelling data, and is an example of plural elements constituting 3D modelling data 92.

In this example, the ancillary data 93 includes movement data for defining movement of 3D models. In one example, operation data is defined as a movement of a bone corresponding to each of a specified movement, e.g., walking, running, jumping, stopping, throwing, swimming, and dancing. For example, the movement data for running defines a step length, raising of a leg, swinging of an arm, and so forth. In another example, movement data may define a movement of a particular part of 3D modelling data, e.g., a facial expression. For example, the movement data of the facial expression defines how a mouth, opens, how eyebrows move, and so forth.

The movement data may be extracted from, for example, a moving image obtained by taking a video of an object. For example, movement data may be generated using a known movement-capture technique. Alternatively, movement data may be provided as a template in 3D data system 1, and may be associated with 3D modelling data either in accordance with a user's selection or automatically by the system.

3D modelling data is generated by a 3D model generating engine. A 3D model generating engine is an example of a generator for generating a 3D model of an object from image data and range data of the object, is, for example, a software module. In this example, a 3D modelling engine is implemented in 3D scanner 40, but 3D modelling engine may be implemented in server 10 in addition to or instead of 3D scanner 40, or may be implemented in other devices.

Referring again to FIG. 4. In this example, the element ID extracted from the API request specifies either high quality, medium quality, or low quality. Accessing means 12 extracts data specified by the element ID from 3D data set 9 including the user ID specified by the API request. For example, if high quality is specified by the element ID, accessing means 12 reads 3D modelling data 921 and bone data from database 111.

At step S107, controlling means 15 performs a process that enables terminal device 30 to use the data read from database 111. The process includes, for example, conversion of a file format. The file-format conversion is, for example, conversion from on type of 3D modelling data to another type of 3D modelling data. Alternatively, the file-format conversion may be from 3D modelling data to another type of data (e.g., video data or image data). The data processed at step S107 is hereinafter referred to as "target data." The process performed at step S107 may be omitted.

Controlling means 15 encrypts (at step S108) the target data. Regarding this process, controlling means 15 is an example of an encrypting means that encrypts data for outputting a 3D model. Two encryption keys are used for encryption. One is private key Km1 of the administrator of server 10. The other is public key Ku2 of terminal device 30 (or the user) that sent the API request.

Figure 6:
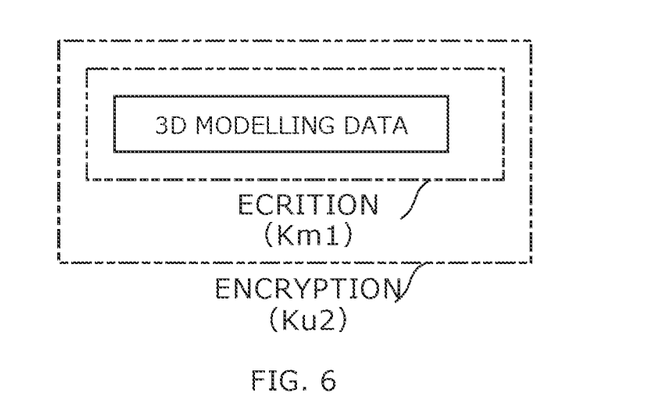
FIG. 6 is a diagram illustrating encrypted data.

FIG. 6 is a diagram illustrating encrypted target data. First, controlling means 15 encrypts the data read from database 111 with private key Km1. Then, controlling means 15 encrypts the data with public key Ku2. Public key Ku2 is registered in the user database in server 10 at a time of user registration, for example. Alternatively, public key Ku2 MAY be included in the API request. The order in which private key Km1 and public key Ku2 are applied may be reversed, i.e., encryption is carried out first with public key Ku2 followed by encryption with private key Km1.

Referring again to FIG. 4. controlling means 15 generates (at step S109) an API response. The API response includes subject data that is double encrypted at step S106. Transmitting means 14 transmits (at step S110) the generated API response to terminal device 30, which is the source of the API request.

Controlling means 15 records in a database (not shown in the figures) a use history of the API, that is, a number of times the API request is processed. Based on this record, controlling means 15 can charge an API usage fee to the operator of application 31.

Although an example in which the API response includes 3D modelling data is described here, as described above, the API response need not necessarily include 3D modelling data. For example, server 10 includes a processing unit (not shown) for processing 3D modelling data. The processing unit generates, for example, a moving image that causes a 3D model represented by 3D modelling data to perform a specified movement (e.g., dancing, sport, etc.) in a virtual space. Controlling means 15 generates an API response including the movement image data.

Application 31 receives (at step S111) an API response from terminal device 30. Upon receipt of the API request, application 31 decrypts it with private key Ku1 of terminal device 30 (or the user) and then decrypts it with public key Km2 of the administrator. Public key Km2 of the administrator is installed, for example, in terminal device 30 when application 31 is installed. To provide an installation file for application 31, controlling means 15 of server 10 distributes public key Km2 to server 20 (an example of a distribution method). Thus, application 31 can utilize a user's 3D modelling data.

In this example, an expiration deadline is set for public key Km2. The availability of the API of server 10 from application 31 depends, for example, on a contract between the operator of server 10 and the operator of server 20. The operator of server 10 can set the expiration deadline of public key Km2 in accordance with the contract. If the contract between the operator of server 10 and the operator of server 20 expires, 3D modelling data cannot be decoded and 3D modelling data cannot be used in application 31. Subsequent use of 3D modelling data requires renewal of the contract and installation of a new public key with a new expiration deadline.

2-2. Regeneration of 3D Models

In this example, the 3D model generating engine regenerates (or updates) 3D modelling data as the algorithm that generates 3D modelling data is updated.

In this example, appendix data 93 includes original image data, distance data, and algorithm ID. The original image data is the image data used to generate 3D modelling data, that is, data of an image (or a photograph) obtained by image capture of an object. The distance data is data obtained by mapping a distance (or depth) from a reference position (e.g., a position of the sensor) to the surface of the object. The algorithm ID is identification information for specifying an algorithm (hereinafter referred to as a "3D modelling algorithm") used to generate the 3D modelling data from the original image data. The original image data, distance data, and algorithm ID are recorded in database 111 when the 3D modelling data is generated. Thereafter, a 3D modelling algorithm is successively updated and improved over time.

In this embodiment regeneration of a 3D model is enabled by updating an algorithm, and it is not necessary to re-image an object each time the algorithm is updated.

Figure 7:
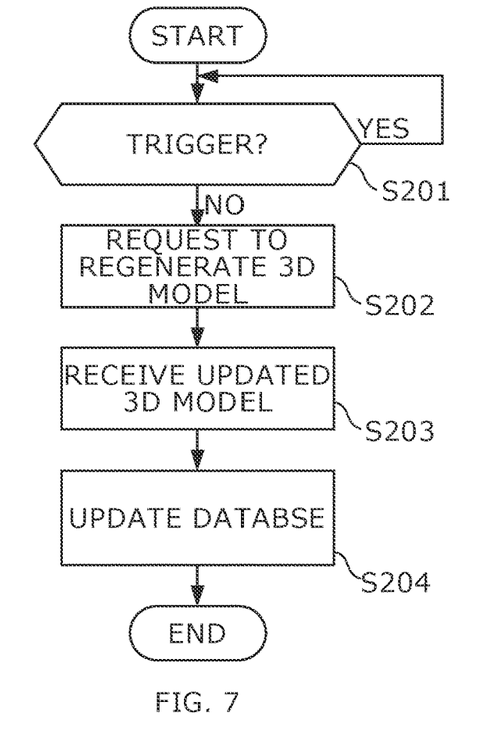
FIG. 7 is a flow chart illustrating a process of regenerating 3D modelling data.

FIG. 7 is a flow chart illustrating a process of regenerating 3D modeled data. At step S201, controlling means 15 determines whether an event that triggers a flow sequence has occurred. An event that triggers the flow sequence is, for example, an event where a predetermined period of time has elapsed since a previous process was performed, or an event where a 3D model generating engine is notified that a 3D modelling algorithm has been updated. If the event that triggers the flow is determined to have occurred, controlling means 15 moves the process to step S202. If it is determined that an event that triggers the flow has not occurred, controlling means 15 waits until an event occurs.

At step S202, controlling means 15 transmits to 3D model generating engine a request for regenerating a 3D model. With respect to this process, controlling means 15 is an exemplary requesting means that requests regeneration of 3D modelling data. The regeneration request includes a user ID, original image data, and distance data. The 3D model generating engine generates 3D modelling data by using the original image data and range data included in the regeneration request. In this example, the 3D model generating engine generates three 3D modelling data of high quality, medium quality, and low quality. The 3D model generating engine transmits the generated 3D modelling data to controlling means 15.

At step S203, controlling means 15 receives the updated 3D modelling data. That is, controlling means 15 is an exemplary obtaining means that obtains updated 3D modelling data. At step S204, accessing means 12 outputs a request for updating 3D modelling data to database 111. The update request includes a user ID and updated 3D modelling data. Database 111 overwrites 3D modelling data included in 3D data set 9 corresponding to the user ID included in the update request with 3D modelling data included in the update request.

According to this embodiment, server 10 can obtain 3D modelling data generated by a most recent 3D modelling algorithms without a need to capture a new image.

2-3. Hypothesis Simulation Process

In this example, a 3D model generating engine generates a 3D model by taking into account a behavior of the object, i.e., the user. That is, the 3D model-generating engine simulates the user's figure based on hypotheses.

Appendix data 93 includes behavior information. The behavior information is information on a behavior of the object during a period from a date on which the original image was image-captured up until a present point in time. The behavior information includes, for example, information on a lifestyle of the target. Lifestyle refers to a habitual behavior of an object, such as eating, exercising, sleeping, working, drinking alcohol, and smoking. Behavior information on meals includes, for example, information on a number of meals, a time, calories consumed, and nutritional value. Behavior information on exercise includes, for example, information on a number of exercises, time, exercise intensity, and exercise type. Behavior information on sleep includes, for example, sleep time, wake-up time, and sleep depth. Behavior information on work includes, for example, information on a start time and an end time. Behavior information on drinking includes, for example, information on a number of times and an amount of drinking. Behavior information on smoking includes, for example, information on a number and amount of smoking. The behavior information is input by the user, for example, when generating 3D modelling data or when registering 3D modelling data in database 111. Alternatively, terminal device 330 uploads information collected by an application (e.g., a health management application), which is separate from application 31, to database 111 at a predetermined timing (e.g., at periodic intervals).

Figure 8:
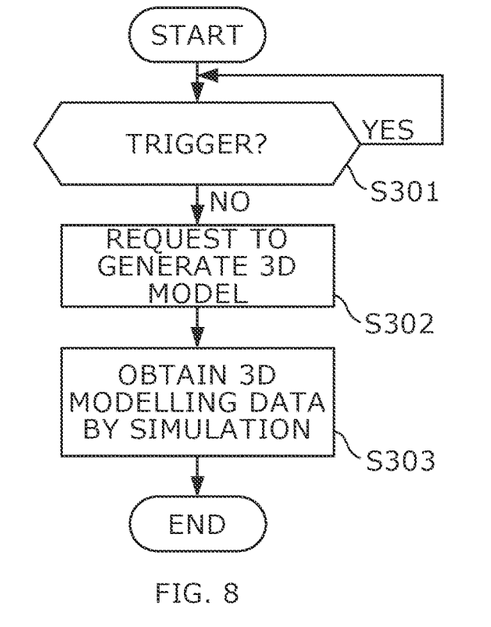
FIG. 8 is a flowchart illustrating a hypothesis simulation process.

FIG. 8 is a flowchart illustrating hypothesis simulation processing. At step S301, controlling means 15 determines whether an event that triggers the flow has occurred. An event that triggers the flow is, for example, an event where a predetermined time has elapsed since a previous processing, or an event where an instruction is received from a user to start the flow. If an event that triggers the flow is determined to have occurred, controlling means 15 moves the process to step S302. When it is determined that an event that triggers the flow has not occurred, controlling means 15 waits until a trigger occurs.

At step S302, controlling means 15 transmits to the 3D model generating engine a request to generate a 3D model. The generation request includes at least a portion of the user ID and behavior information recorded in database 111, current 3D modelling data, and time-related information. Controlling means 15 selects the behavior information included in the generation request from among the behavior information recorded in database 111. For example, controlling means 15 selects behavior information in accordance with an instruction from the user. The time information is information specifying when to simulate a time state (e.g., one year hence, ten years hence, etc.). Controlling means 15 specifies time information in accordance with an instruction from the user, for example.

3D model generating engine generates new 3D modelling data using 3D modelling data and the behavior data included in the generation request. In one example, machine-learning techniques are used to simulate temporal changes in 3D models based on behavior information. 3D model generating engine includes a machine learning model. The machine learning model is a learned model in which, for each of plural users, 3D modelling data of a user at a first time point, behavior data of the user during the periods from the first time point to a second time point, and a time from the first time point to the second time point are provided to an input layer, and 3D modelling data of the user at the second time point is provided to an output layer as training data to cause the output layer to perform machine learning. For example, data recorded in database 111 is used as training data. The 3D model generating engine provides current 3D modelling data, behavior information, and time information contained in the generation requests for input to machine-learning model. The machine-learning model outputs 3D modelling data corresponding to the data. The 3D modelling data indicates a date and time as time information or an expected 3D model associated with the time information.

An example can be presumed where information indicating that muscle training is regularly performed in a sports gym is input as behavior information, and information indicating one year later is input as time information. In this example, the machine-learning model outputs 3D modelling data reflecting an expected change in body shape if the user continues muscle training for a period of one year.

At step S303, controlling means 15 obtains the simulated 3D modelling data from the 3D model generating engine. Controlling means 15 outputs 3D modelling data in response to requests from application 31 or the like.

According to this embodiment, server 10 can obtain 3D modelling data indicating results of simulations based on behavior information, i.e., indicating future expectations.

2-4. Process of Recording Edit History in a Blockchain

In this embodiment, application 31 has the function of editing 3D modelling data. Such editing includes, for example, processing to change hair color, hair length, beard, beard length, skin color, fattening, slimming, age, rejuvenation, gender change, clothing change, putting on/taking off eyeglasses, changing eyeglasses, changing makeup, changing accessories, etc. In this example, it is possible to verify whether editing by these processes is valid by using blockchain technology.

Figure 9:
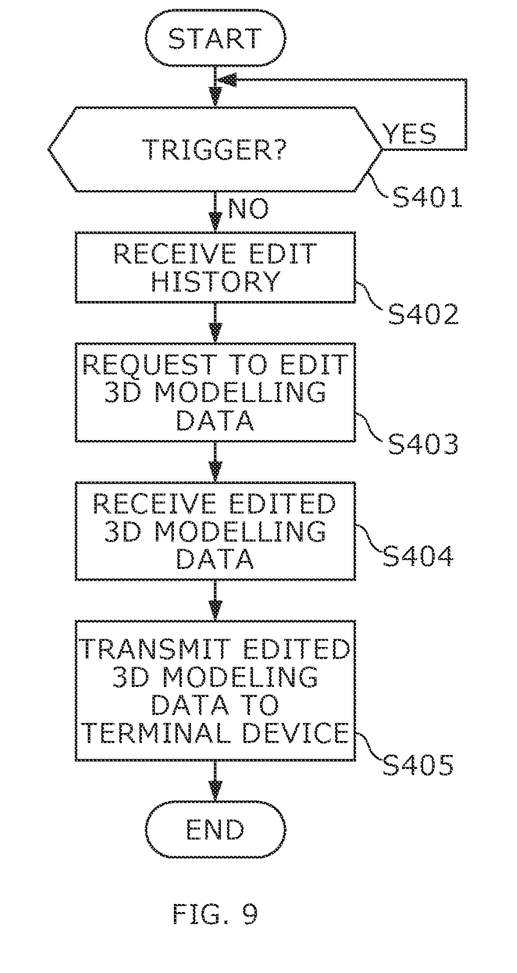
FIG. 9 is a flowchart illustrating a process of recording an edit history in a blockchain.

FIG. 9 is a flowchart illustrating a process of recording an edit history of a blockchain. At step S401, controlling means 15 determines whether an event that triggers the flow has occurred. The event that triggers the flow is, for example, an event that occurs upon receipt of an instruction from a user to start a flow. If the event that triggers the flow is determined to have occurred, controlling means 15 moves the process to step S402. If it is determined that an event that triggers the flow has not occurred, controlling means 15 waits until a trigger occurs.

Prior to or after the processing at step S401, terminal device 30 receives from the user an instruction to edit 3D modelling data. Terminal device 30 transmits to server 10 an edit history indicating an accepted editing instruction. The edit history includes information on an identity of 3D modelling data and a content of editing.

At step S402, receiving means 13 of server 10 receives the edit history from terminal device 30. Controlling means 15 requests (at step S403) 3D model generating engine to edit (or modify) 3D modelling data in accordance with the received edit history. The request includes the edit history. 3D model generating engine modifies 3D modelling data in accordance with the request. 3D model generating engine transmits the modified 3D modelling data to the server 10. Controlling means 15 in server 10 receives (at step S404) the modified 3D modelling data.

Prior to modifying 3D modelling data, controlling means 15 may confirm with the user, who is the object of 3D modelling data, to consent to editing of 3D modelling data. If consent of the target user is not obtained, controlling means 15 rejects editing of 3D modelling data on the assumption that the variant instruction is not in accordance with the intention of the object. If agreement of the target user is obtained, controlling means 15 requests 3D model generating engines to edit (or modify) 3D modelling data in accordance with the received edit history.

In this example, the user, who is the object, may edit their 3D modelling data, or may grant generic permissions. A scope of authorization is specified, for example, by a user who is an object. For example, the generic permissions may limit editing of portions of 3D modelling data. Specifically, the user restricts the scope of editing 3D modelling data, such as "hair color can be changed," "skin color cannot be changed," and "clothes cannot be changed." Alternatively, the generic permissions may limit the attributes of the user attempting editing. Specifically, the user restricts users who can edit 3D modelling data, such as "not permitted when the person who intends to edit is male," "permitted when the person who intends to edit is under 13 years old," and "permitted when the person who intends to edit resides in Japan."

Controlling means 15 transmits (at step S405) the modified 3D modelling data to terminal device 30, which is the source of the editing instruction. Further, controlling means 15 requests (at step S406) the network of the predetermined blockchain to write the IDs of 3D modelling data and the edit history related to the editing into a ledger. In this process, controlling means 15 is an example of a request means that requests that an edit history be written to the ledger or the blockchain. A miner node belonging to the blockchain network will attempt mining upon receipt of the edit history. A miner node, which has successfully completed the mining, creates a new block containing the edit history and provides it to the network. When a node other than that which has successfully completed the mining, receives a new block, the (other) node verifies that the block was correctly created. The node adds a block authorized by the node to the blockchain held by the node. In this way, the edit history of 3D modelling data is recorded in the blockchain. In this example, only the edit history is recorded in the blockchain, and 3D modelling data is not recorded in the blockchain.

Figure 10:
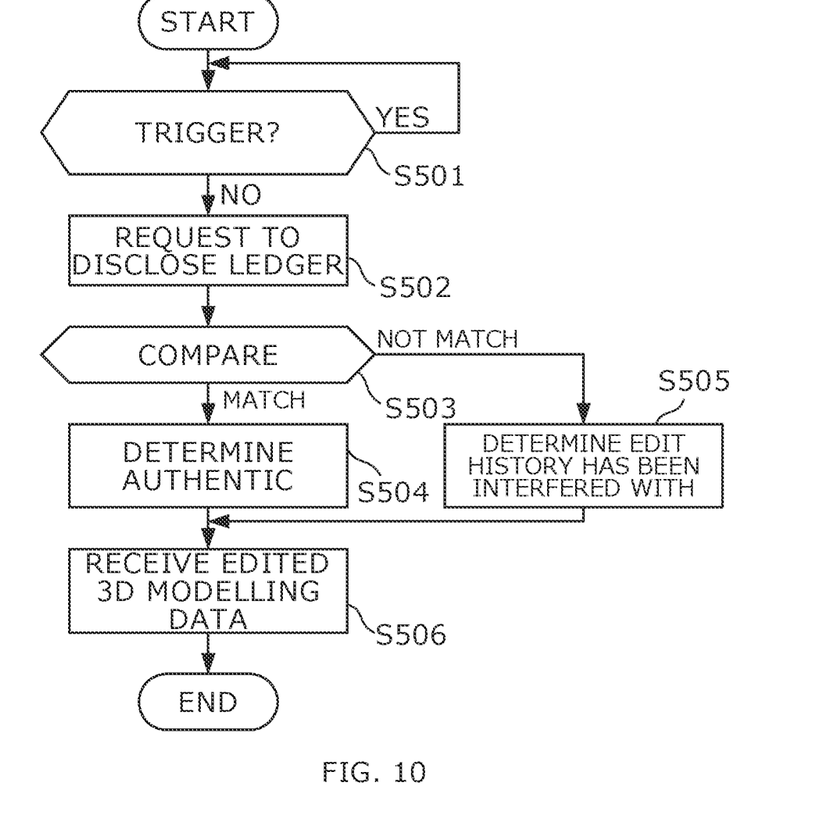
FIG. 10 is a flow chart illustrating a process for verifying 3D modelling data.

FIG. 10 is a flow chart illustrating a process for verifying 3D modelling data. At step S501, controlling means 15 determines whether an event that triggers the flow has occurred. The event that triggers this flow is, for example, an event where a request is received from application 31 to confirm whether the edit history is authentic, or an event where a predetermined time has elapsed since a previous confirmation of whether the edit history is authentic. For example, application 31 requests confirmation from server 10 as to whether an edit history shared by other users is authentic. The acknowledgment request includes, for example, an identity of 3D modelling data and an edit history for verification. If the event that triggers the flow is determined to have occurred, controlling means 15 shifts the process to step S502. If it is determined that an event that triggers this flow has not occurred, controlling means 15 waits until an event occurs.

At step S502, controlling means 15 requests the blockchain network to disclose the ledger. The blockchain may be any of a public chain, a private chain, and a consortium chain. Controlling means 15 searches the edit history of 3D modelling data included in the request in the ledger disclosed by the network. Controlling means 15 compares (at step S503) an edit history obtained by a search of the edit history included in the confirmation request. If the two histories match (S503: YES), controlling means 15 determines (at step S504) that the edit history included in the confirmation request is authentic. If the two histories do not match (S503: NO), controlling means 15 determines (at step S505) that the edit history included in the check request has been interfered with.

Controlling means 15 transmits (at step S506) the result of the verification to terminal device 30, which is the transmission source of the confirmation request. Thus, application 31 can confirm whether the obtained edit history is authentic.

In editing of 3D modelling data, the process in the blockchain is not limited to the foregoing. For example, controlling means 15 may extract the username (and the date and time) used to edit the target 3D modelling data in the past from the edit history recorded in the blockchain, and provide the extracted data to terminal device 30. Alternatively, controlling means 15 may extract a previously edited portion (and the date and time thereof) of the target 3D modelling data and provide the extracted data (and the date and time) to terminal device 30.

Application 31 may perform at least a part of the processing described above in server 10. For example, instead of server 10, application 31 may request disclosure of the ledger to the blockchain network.

3. Modification

The present invention is not limited to the embodiments described above, and various modifications can be envisaged. Some variations will be described below. Part of the items described in the following modified examples may be combined with other items.

In the above embodiment, 3D modelling data is recorded in database 111. However, 3D modelling data may not be recorded in database 111 and may be generated on demand. Upon receiving an API request from terminal device 30, server 10 requests the model generation engine to generate 3D modelling data (here, this process is an example of processing a data request). The request includes image data and range data of the object. Model generation engines process the image data and range data in accordance with an algorithm to generate 3D modelling data for the object. Server 10 obtains 3D modelling data thus generated. In this example, each time server 10 receives an API request from terminal device 30, the requested 3D modelling data is generated.

In the above example, the model generation engine may use different algorithms. The model generation engine generates 3D modelling data according to one algorithm selected from among plural algorithms. In this case, the API request transmitted from terminal device 30 includes information that specifies one algorithm from among the plurality of algorithms. Server 10 requests the 3D model generation engine to generate 3D modelling data by selecting an algorithm specified by the API request.

The ledger for recording the edit history is not limited to a blockchain. The edit history may be recorded in a form other than a blockchain, such as a database in server 10. In a case where the edit history is recorded in the database, server 10 may encrypt the target data by using information generated from an edit history (for example, a hash value of the edit history) as an encryption key instead of or in addition to encryption using private key Km1 and public key Ku2. In this case, only the device that holds the edit history can decode the target data.

In the embodiment, the subject data that is double encrypted by private key Km1 and public key Ku2 is transmitted to terminal device 30. Accordingly, the target data cannot be decoded unless the terminal has both public key Km2 and private key Ku1. However, server 10 may authenticate terminal device 30 (and/or the user) prior to transmitting the target data. In this example, server 10 does not transmit the target data until terminal device 30 (and/or its user) is authenticated.

In the embodiment, an example in which an API request is transmitted from terminal device 30 or the user terminal (that is, an example of a so-called BtoC service) has been described, but the information processing device that transmits an API request to server 10 is not limited to terminal device 30. A server operated by another operator, such as server 20, may send an API request to request transmission of data to output a 3D model of the user of terminal device 30 to server 10. That is, the present invention may be applied to a BtoB service. In this example, Ku1 and Ku2 are the private and public keys of the operators of the servers, respectively.

An expiration period of the encryption key is not limited to that illustrated in the embodiment. For example, in a case of transmitting 3D modelling data to terminal device 30 (i.e., in a case of a BtoC service) and a case of transmitting 3D modelling data to server 20 (i.e., in a case of a BtoB service), an expiration deadline of public key Km2 may differ. Specifically, in the former case, the expiration deadline may be longer (e.g., indefinite), and in the latter case, the expiration deadline may be shorter (e.g., finite, such as 1 year or 2 years).

Although an example in which 3D modelling data is provided by the API provided by server 10 is described in the embodiment, the method of providing 3D modelling data is not limited to using the API.

Part of the functions or processes described in the embodiments may be omitted. For example, 3D modelling data may not be encrypted when 3D modelling data is transmitted to terminal device 30.

The hardware configurations of server 10, server 20, and terminal device 30 are not limited to those illustrated in the embodiment. For example, server 10 may be a physical server or a so-called cloud-based virtual server.

At least a part of the processing described as being performed by server 10 in the embodiment may be performed by terminal device 30, for example, application 31. A part of these functions may be omitted.

The program executed by CPU 101 or the like may be provided in a downloadable state from the server via the Internet, or may be provided in a state stored in a recording medium such as a CD-ROM.

The invention claimed is:

1. A server comprising:
a processor; and
a memory operably connected to the processor, wherein the processor is configured to:
  access a database storing 3D data sets for a plurality of objects, the 3D data sets including 3D modelling data and appendix data for each of the plurality of objects, the 3D modelling data including a plurality of elements of a 3D model;
  receive from an information processing device an application programming interface (API) request including information specifying an object, the API request further specifying at least one element of the 3D modelling data of the object, the element being selected to be used from among the plurality of elements in the database; and
  transmit to the information processing device, as an API response to the API request, data for outputting the 3D model indicated by the 3D modelling data including the at least one element of the model in the database, the at least one element being specified by the API request and extracted from the database.

2. The server according to claim 1, wherein
the appendix data includes an image of the object obtained by an image capture device,
and wherein the processor is further configured to:
  request generation of 3D modelling data from the image of the object in accordance with an algorithm, and
  obtain the 3D modelling data generated from the image.

3. The server according to claim 2, wherein
the processor requests regeneration of 3D modelling data using an updated algorithm in response to an event indicating that the algorithm has been updated, and the processor obtains the 3D modelling data using the updated algorithm.

4. The server according to claim 3, wherein
the appendix data includes behavior information indicating a behavior of the object during a period from a date of the image capture to a present point in time,
the processor requests the generation of the 3D modelling data using the image, the behavior data, and the updated algorithm, and
the processor obtains, the image, the behavior data, and the 3D modelling data by using the updated algorithm.

5. The server according to claim 2, wherein
the processor generates the 3D modelling data in accordance with one algorithm selected from among a plurality of algorithms,
the API request includes information specifying the one algorithm from among the plurality of algorithms, and
the processor selects the one algorithm specified by the API request and requests generation of the 3D modelling data.

6. The server according to claim 1, wherein
the processor receives information indicating that the 3D modelling data has been edited in the information processing device, and
the processor is further configured to:
  request a record of an edit history indicating that the editing has been performed.

7. The server according to claim 6, wherein the processor is further configured to
encrypt data for outputting the 3D model by using an encryption key generated using the edit history.

8. The server according to claim 6, wherein
the processor receives a record request from the information processing device to confirm whether the 3D modelling data is authentic and includes data indicating an edit history of the 3D modelling data, and determines whether the 3D modelling data is authentic by referring to the record.

9. The server according to claim 1, further comprising
storage that stores a private key of a management operator of the server, and public keys of a plurality of users, wherein
the API request includes information identifying a public key of a user using the information processing device,
the data for the 3D model requested by the API request is encrypted by the processor with the private key of the management carrier and the public key of the user using the information processing device, and
the processor transmits data to output to the information processing device, as the API response, the 3D modelling data encrypted by the processor.

10. The server according to claim 9, wherein
the public key of the user corresponds to the private key of the management operator, and wherein
the processor is further configured to:
  distribute the public key with a set expiration deadline.

11. An information processing method comprising:
accessing a database that stores 3D data sets for a plurality of objects, the 3D data sets including 3D modelling data and appendix data for each of the plurality of objects, the 3D modelling data including a plurality of elements of a 3D model;
receiving from an information processing device an application programming interface (API) request that includes information specifying an object, the API request further specifying at least one element of the 3D modelling data of the object, the element being selected to be used from among the plurality of elements in the database; and transmitting to the information processing device, as an API response to the API request, data for outputting the 3D model indicated by the 3D modelling data including the at least one element of the 3D model in the database, the at least one element being specified by the API request and extracted from the database.

\* \* \* \* \*